United States Patent [19]

Kochert

[11] 4,262,280
[45] Apr. 14, 1981

[54] CIRCUIT ARRANGEMENT FOR EDITING A SCANNED PATTERN

[75] Inventor: Wilfried Kochert, Constance, Fed. Rep. of Germany

[73] Assignee: Computer Gesellschaft Konstanz mbH, Fed. Rep. of Germany

[21] Appl. No.: 29,016

[22] Filed: Apr. 11, 1979

[30] Foreign Application Priority Data

Apr. 18, 1978 [DE] Fed. Rep. of Germany ....... 2816839

[51] Int. Cl.³ .............................................. G06K 9/44
[52] U.S. Cl. ............... 340/146.3 MA; 340/146.3 AG
[58] Field of Search .......... 340/146.3 MA, 146.3 AG, 340/146.3 ED

[56] References Cited

U.S. PATENT DOCUMENTS

| | | | |
|---|---|---|---|
| 3,104,372 | 9/1963 | Rabinow et al. | 340/146.3 AG |
| 3,582,887 | 6/1971 | Guthrie | 340/146.3 AG |
| 3,644,890 | 2/1972 | Matthews | 340/146.3 AG |
| 3,676,847 | 7/1972 | Partin | 340/146.3 AG |
| 3,688,266 | 8/1972 | Watanabe et al. | 340/146.3 MA |
| 3,973,239 | 8/1976 | Kakumoto et al. | 340/146.3 AG |

*Primary Examiner*—Leo H. Boudreau
*Attorney, Agent, or Firm*—Hill, Van Santen, Steadman, Chiara & Simpson

[57] ABSTRACT

For compensating tolerances within a photodiode matrix of a scanning unit, in a single scanning process, various momentary, column, displaced positions of a scanning pattern are compared with one another as current image signals. To this end, the plurality of black elements in an image signal to be first intermediately stored in a first image memory is counted in an image element counting device. When the current image signal reproduces a "fat" character, the white elements of the current image signal and of a correlated image pattern intermediately stored in a second image memory are disjunctively linked with one another in a switching device. Given "weak" characters, the black elements are employed. Insofar as the direction of the relative velocity between the scanning unit and a recording medium is not prescribed, a plurality of positions of the correlated image signal are to be employed for a comparison in a comparator circuit. This comparison yields the position with the best coincidence. Therefore, a center/left or, respectively, a center/right displacement of the current image signal with respect to the correlated image signal can be compensated by means of a corresponding control of the switching device. The independence of the scanning direction offers an advantage in a preferred use of the circuit arrangement in hand-held reading devices.

7 Claims, 6 Drawing Figures

CIRCUIT ARRANGEMENT FOR EDITING A SCANNED PATTERN

BACKROUND OF THE INVENTION

1. Field of the Invention

The present invention relates to a circuit arrangement for editing a scanned pattern in a device for machine recognition of characters, in which the circuit arrangement has the scanning unit having a two-dimensional photodiode matrix, with respect to which the recording medium is to be scanned and which is moved relative thereto and which, in a scanning process, continuously emits a plurality of image patterns respectively position-displaced with respect to one another and converted into digitized image signals, which patterns are intermediately stored before further evaluation in an image memory.

2. Description of the Prior Art

When a pattern to be scanned is converted into an image signal by a photodiode matrix arranged in the scanning unit as a recording medium passes by a scanning unit, or as a scanning unit is conducted past a stationary recording medium, then the digitized image signal does not clearly correspond in all elements to the black-white distribution of the pattern to be scanned. Even when the threshold value for the digitization of the image signal is favorably selected, signal falsifications occur. These signal falsifications result from the fact that the individual photodiodes of the photoelectric transducer exhibit a relatively high tolerance arranged with respect to sensitivity. This means that the optical signals to be allocated to the individual pattern elements are scanned with large, varying sensitivities. In the case of weaker patterns, this can lead to a partial perforation, whereas, on the other hand, "fat" scanning patterns can appear even thicker, given threshold values that are adjusted too low.

In character recognition devices heretofore known, two-dimensional photodiode matrices, consisting of a plurality of lines and columns, have been employed to a limited extent. Because of the technology of the integration of electronic component elements which was, up to now, not favorably that far advanced, instead, up to now, photodiode lines with a built-in interrogation shift register were employed more than any other technique. Compared with such a photodiode matrix, these photodiode lines contain only relatively few photoelectric elements. It is therefore known to compensate the tolerances of the individual photodiodes with respect to their sensitivity which also occur here and the signal deviations in the scanning of the character by means of a correction of each individual scanning element. In such a compensation, a calibration norm with an unequivocal white ground is scanned and a specific correlation value is determined and stored from the scanning result of each individual photodiode. Then, during the scanning of the patterns, these correction values for the individual photodiodes are used to eliminate the tolerance deviations of the individual photodiodes respective to their sensitivity by means of the correction of the bit signal emitted by the photodiode line. It can be easily imagined that such a correction of the signal elements emitted by the individual photodiodes would involve a great expense in the case of a larger photodiode matrix as the same are commercially available today, particularly since it must be taken into consideration that the sensitivity of the electronic component part or, respectively, of its individual elements, is also dependent on aging.

In the given case, since such a correction of the individual values of the photodiodes thus proves to be inexpedient, one must seek out other alternatives in order to compensate these interference factors. Now, as is known, an object of the preprocessing of the scanned character or, respectively, of the digitized image signal corresponding to the same, before the actual classification is to produce a certain normalization of the scanning pattern. The actual classification procedure is all the easier the more similar the scanning patterns, which are to be allocated to a specific meaning class, are to one another. In this context, for example, processes of line width normalization are known in which, for the correction of the scanning result for a scanning element of an image pattern, the state ascertained in the environs of the scanning element is also employed. Therefore in a corresponding evaluation of the environs of a scanning element, frayed contours of the scanning pattern, for example, can be corrected. These correction procedures, however, have the disadvantage that there is always uncertainty in the use thereof as to which threshold value one is to set for the correction when one wishes to indeed only to fill gaps, or, respectively, when a threshold that has been set too low is to be corrected, i.e. a black element is to be translated.

Further, it is known in machine character recognition to multiply scan a character in the editing phase instead of using such correction procedures. Each of these scanning patterns is then digitized and subjected to further necessary processing steps before classification, for example a segmenting. Subsequently, one can attempt to assign every single one of the scanning patterns to a specific meaning class. For the final allocation, i.e. classification of the scanned character, the scanning pattern is then selected which offers the greatest probability for a specific meaning class. This procedure, however, means a repeated classification attempt; the character recognition process is accordingly expensive and slow.

SUMMARY OF THE INVENTION

The object of the present invention, therefore, is to provide a circuit arrangement of the type initially mentioned above in which one succeeds in a different manner of arriving with justifiable expense at the meaningful compensation of the photodiode tolerances, in order to offer scanning patterns to a recognition unit, which scanning patterns are as complete as possible on the one hand, on the other hand, do not vary too greatly in line width.

The above object is achieved, according to the present invention, in that a second image storage for a so-called correlated image pattern, by an image element counting installation which, for each current image signal to be intermediately stored in the first image storage, counts the black elements parallel to the writing-in and characterizes a "fat" scanning pattern with an output signal in the state "1" only upon a counter reading of a prescribed threshold value. A switching device is arranged between the first image memory and the second image memory and is connected to the output of the image element counter, with which the pattern elements of both storage contents corresponding to one another are disjunctively linkable on a position-synchronous basis, whereby to such end, depending on the state of the output signal of the image element counter, the black image elements are employed in case of weak characters, whereas the white picture elements are employed in the case of fat characters and the content of the second image memory is re-written with the result.

In the solution, the fact is exploited that, even with a single scanning process, a displaced momentary image of the scanning pattern occurs on such a photodiode matrix in temporal succession because of the low response time of modern electronic component elements. Because of the tolerances of the individual photodiodes, the elements of the scanned pattern are variously evaluated in the various positions, and are therefore reproduced in the one momentary image is black, and in another momentary image as white elements. The invention exploits this possibility of modern electronic component elements in order to evaluate various momentary positions of the image pattern during a single scanning process. In the evaluations these are, figuratively speaking, superimposed upon one another and then the differences of the individual scanning results are corrected by means of the logical linkage of the states of the individual scanning elements corresponding to one another. This correction is carried out in such a manner that, with weak characters having thin line widths, the black image elements are respectively disjunctively combined, whereas the white image elements are disjunctively combined in the case of strong characters having wide line widths. The circuit arrangement thus exploits the property of an entire character, "fat" and "weak" are differentiated independently of the meaning content, in order to compensate differences in the individual momentary image patterns either by weakening or strengthening a character.

This correlation of individual momentary scanning results is significantly less expensive than the case of a very extensive photo diode matrix with, for example, 1024 bit positions for a complete scanning pattern than the constantly new calculation of correction values for each individual photodiode and is more favorable with respect to the recognition security than a process for normalization of a scanning pattern which only takes the environs of a scanning element into consideration.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
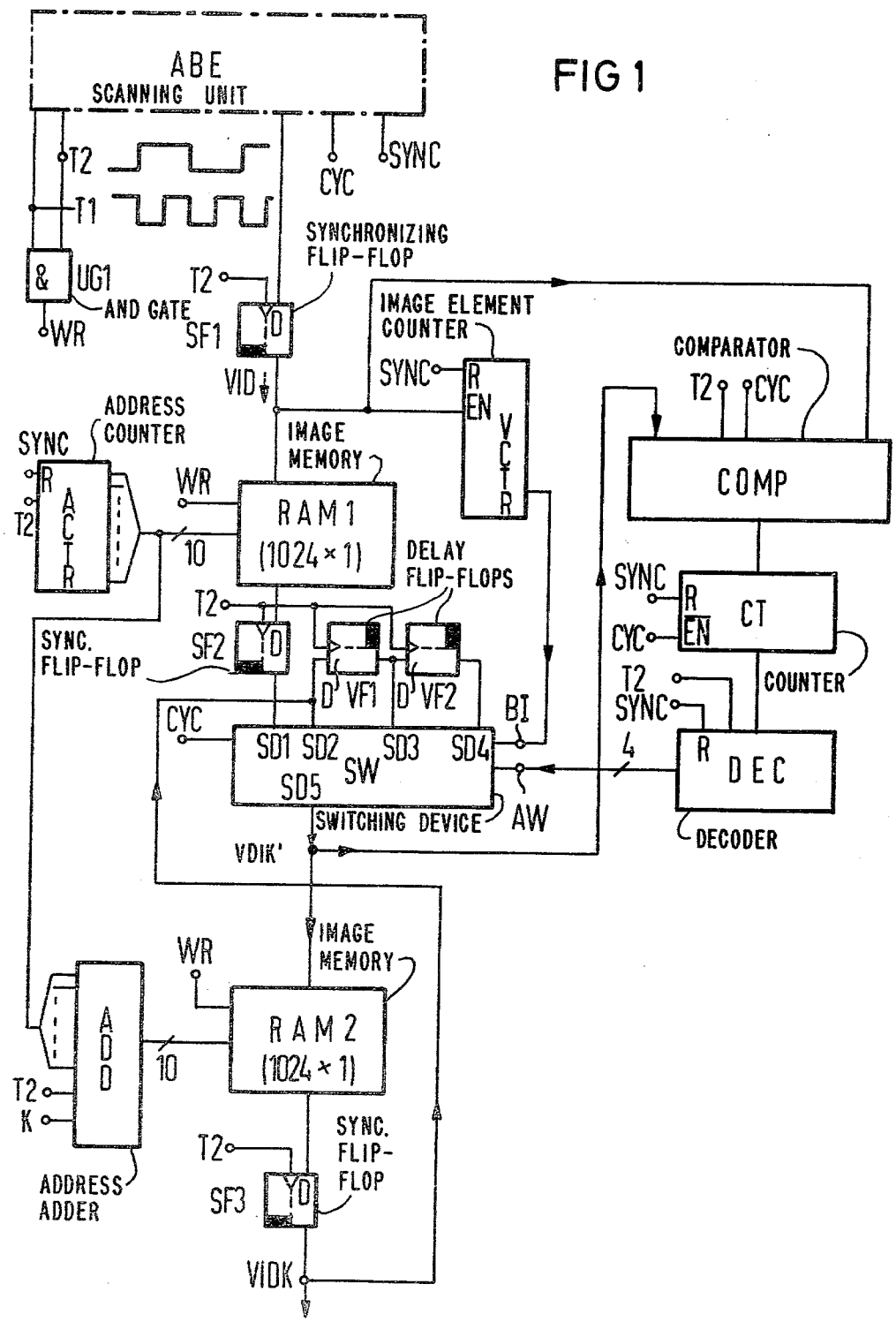
FIG. 1 is a schematic block diagram of a circuit arrangement constructed in accordance with the present invention for editing a scanned sample.

A block circuit diagram for a circuit arrangement for editing a scanned pattern illustrated in FIG. 1 comprises a scanning unit ABE, which is only illustrated with dot-dash lines in order to indicate that such a unit per se is no longer a part of the circuit arrangement of the invention. However, all of the signals that are of significance for the circuit arrangement proceed and are obtained from such a scanning unit. Therefore, in addition to scanned image signals VID, the scanning unit delivers a series of control signals. The control signals are, above all, two clock pulses T1 and T2 whose pulse ratios are illustrated on the drawing adjacent the respective reference characters. These signals run synchronously with respect to the video signal VID and serve, above all, as will be specifically set forth below, for the temporal synchronization of all switching processes. In addition, the scanning unit ABE delivers a scaling or norm signal SYNC. This signal is always emitted during a clock pulse T2 when a complete image pattern is emitted by the scanning unit ABE. The SYNC signal then serves to return all of those circuits whose switching stage is continuously changed upon transmission of an image pattern to a defined initial value. Finally, the scanning unit ABE also emits a blanking signal CYC which is emitted during the transmission of the left or the right edge columns of an image pattern, so that these remain unconsidered during the editing of the image pattern. It should be added here that the two clock pulses T1 and T2 are connected by way of a first AND gate UG1 to a further control signal, a write signal WR, whose use will be explained below.

The image signal VID emitted by the scanning unit ABE is supplied to a first synchronizing flip-flop SF1 which is prepared by means of the slow, second clock pulse T2. This synchronized video signal VID is then first supplied to the data input of the first image memory RAM1. The storage capacity of the memory RAM1 corresponds to a complete image pattern, in the present example, therefore, $1024 \times 1$ bit, whereby one must proceed therefrom that a sensor field in the scanning unit ABE consists of 16 columns and 64 lines, a complete image signal, therefore, corresponds to 1024 bits. This image signal VID is transmitted out of the scanning unit ABE line-by-line and bit-serially. Controlled by means of the write signal WR, the image signal is taken over, in bit-serial form, into the first image memory RAM1 in this form. An address counter ACTR is provided for the address selection of the first image memory RAM1. The address counter ACTR is counted up with the second clock pulse T2 and is then, respectively, reset at the end of an image transmission by means of the synchronizing signal SYNC. A second synchronizing flip-flop SF2, which is likewise controlled by means of the second clock pulse T2, is connected to the data output of the first image memory RAM1. With its output, the second synchronizing flip-flop SF2 is connected to a first data input SD1 of a switching device SW. The switching device SW exhibits three further data inputs SD2, SD3 and SD4, whose significance will be explained below. Moreover, the blanking signals CYC is supplied thereto as a control signal. Further, the switching device SW is connected to the output of an image element counter VCTR. The counter VCTR, also, is reset by means of the synchronizing signal SYNC at the end of an image transmission. The counter VCTR has a counting input EN to which the image signal VID emitted at the output of the first synchronizing flip-flop SF1 is supplied. During an image transmission, therefore, the counter counts all black image elements and delivers a threshold signal BI to the switching device SW as a control signal. The threshold value BI is always respectively in the state "1" when the counter reading of the counter VCTR exceeds a predetermined value for the polarity of black elements in an image pattern and, therefore, characterizes the image pattern as a "fat" pattern. Beyond that, the switching device SW receives a selection signal AW comprising four bits which is emitted by a decoder DEC, also to be explained below.

A second image memory RAM2 is connected to a data output SD5 of the switching device SW. The second image memory RAM2 also has a storage capacity for a complete image pattern with $1024 \times 1$ bits. It is addressed by way of an address adder ADD and accepts the output data offered by the switching device SW when the write signal WR is supplied thereto at the same time. The address adder ADD is first adjusted with the output signals of an address counter ACTR. For reading the second image memory RAM2, however, a constant K must be subtracted from the address offered by the address counter ACTR in order to, as will be explained below, read the content of the second image memory RAM2 position, synchronous to the image signal VID. This address substitution, however, is to occur only during the reading process from the second image memory RAM2, for this reason the slow clock pulse T2 whose pulse pause respectively temporally determines a read cycle is likewise offered to the address adder ADD. Finally, the output data of the second image memory RAM2 are emitted at the output of the circuit arrangement by way of a third synchronizing flip-flop SF3 for further processing as a so-called correlated image signal VIDK.

The correlated image signal VIDK is also trebly offered to the switching device SW for linkage with the current image signal VID which is intermediately stored in the first image memory RAM1. To this end, the correlated image signal VIDK is directly supplied to the switching device SW by way of its second data input SD2 and is supplied by way of two delay flip-flops VF1 and VF2 connected in series to the third and fourth data inputs SD3 and SD4, respectively, of the switching device SW, delayed by a column interval. Therefore, here it also becomes clear why the storage address for the second bit memory RAM2 was modified upon the reading process. For thereby it is possible to offer the switching device correlated image signals position-synchronous to the current image signals VID. The address modification is of such a configuration that, together with the delay of the correlated image signals VIDK given a relative velocity of 0 of the scanning unit ABA with respect to a recording medium to be scanned, the correlated image signal is offered to the switching device SW in three different positions of which the central position is position-synchronous to the current image VID.

The output of the switching device SW is, moreover, connected with a comparator circuit COMP which therefore likewise receives in fact a correlated image signal VIDK', which has yet to be stored in the second image storage memory RAM2. In this, the current image signal VID, which is likewise supplied thereto, is compared with this correlated image signal VIDK' in three positions and the best coincidence is determined. This is achieved in that the image elements with coincidence signal state are counted during an image transmission for each of the positions in a counter circuit CT connected to the comparator circuit COMP. To this end, the counter circuit CT must likewise respectively be in a defined initial state at the beginning of the transmission of a complete image pattern, which is achieved with the synchronizing signal SYNC supplied thereto.

At the end of a transmission process, the comparison result residing in the counter circuit CT is transmitted to a decoder DEC which converts the input magnitudes supplied thereto into the selection signal AW, which is supplied to the switching device SW. This control signal, therefore, defines that position of the correlated image signal VIDK for the switching device SW which best coincides with the current image signal VID. On the basis of this comparison, expressed by means of the state of the selection signal AW, the switching device SW then links one of the two correlated image signals VIDK offered thereto, via the data inputs SD2 or SD4 respectively, with the current image signal read from the first image storage memory RAM1. The type of linkage, thereby, depends on the threshold signal BI of the image element counter supplied to the switching device SW. The state "0" of the threshold signal characterizes a transmitted image pattern with but few black image elements, i.e. a "weak" character. In this case, the switching device SW links the offered current image signal VID with the selected correlated image signal VIDK in such a manner that all black image elements of both image patterns are disjunctively linked. In the therefore newly arising correlated image signal, a "weak" image pattern is thus filled up. On the other hand, the threshold signal BI of the image element counter is in the state "1" when a "fat" image pattern is transmitted. The threshold signal BI then controls the switching device SW in such a manner that now the white image elements of the image signals VID or, respectively, VIDK of the selected position are disjunctively linked with one another. A "fat" image pattern is thus weakened to a certain degree.

This editing of a scanned image pattern takes into consideration the fact that the individual photodiodes in a photodiode matrix which is employed as a photoelectric transducer in the scanning unit ABE exhibit a relatively high tolerance range with respect to sensitivity. It follows therefrom that the optical signals within the photodiode matrix are scanned with large varying sensitivity. Weaker characters, thus, can be partially perforated.

Even with a single scanning of a recording medium with a specific relative velocity of the scanning unit ABE with respect to the recording medium, different momentary exposures with different positions of a scanned pattern result on the photodiode matrix, i.e. on the sensor surface of the scanning unit. Given the different sensitivities of the photodiodes, however, this also means apparently different characters according to the position which the optically-scanned character assumes on the matrix. In the circuit arrangement described above, a variety of such positions, figuratively speaking, are superimposed upon one another and differences in the individual momentary image patterns are thus compensated.

To this end, the current image signal VID is compared with a correlated image signal VIDK residing in the second image memory RAM2 in three positions lying next to one another. The position of the greatest coincidence is determined by means of the comparator circuit COMP. The momentary image signal VID intermediately stored in the first image storage memory RAM1 can then be linked with the image signal residing in the second image memory RAM2 in the position of the best coincidence. The comparison of the correlated image signal VIDK with the current image signal VID in three different positions lying next to one another offers the possibility of determining the correlation independently of the prescribed scanning direction of the recording medium, because the scanning direction also ensues from the best coincidence of the current image signal VID with one of the three positions of the correlated image signal VIDK. Therefore, it is possible to permit scanning directions from left to right or, respectively, also from right to left.

However, given a scanned image pattern comprising 1024 bits, it would involve a rather large expense to completely compare such an image pattern with three already correlated complete image patterns. In the case of the usual image patterns, particularly, therefore, script characters, this also is not required. As is known, the essential information in a multitude of these patterns lies in the contour of the scanned character. If one exploits this, then the comparison is significantly more simple. In order to explain this in greater detail, FIG. 2 illustrates a preferred exemplary embodiment for that portion of the circuit arrangement illustrated in FIG. 1 with which the comparison of the current image signal VID with the correlated image signal VIDK is carried out in three different positions and with which the comparison result is transmitted to the switching device SW in the form of the selection signal AW.

Figure 2:
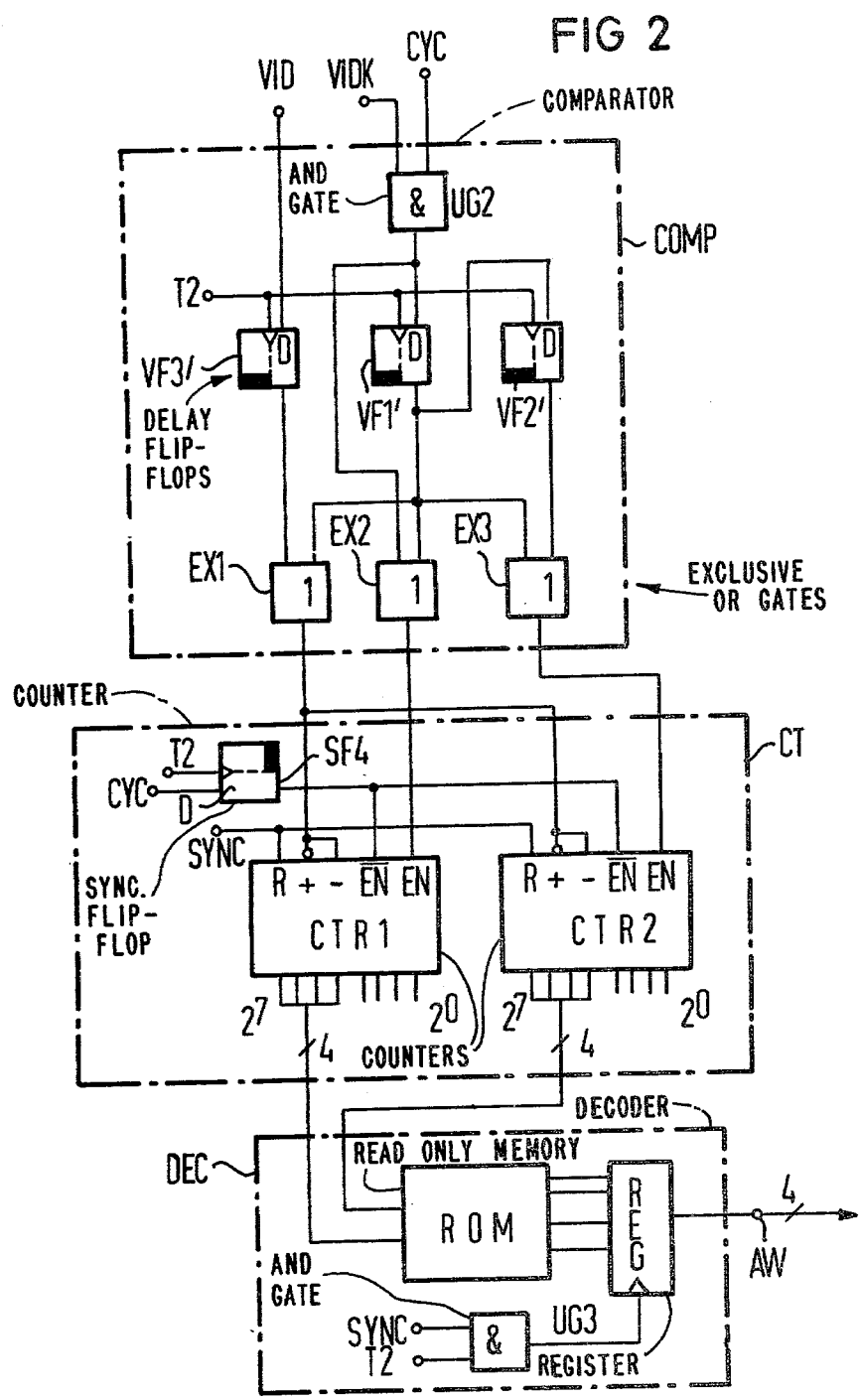
FIG. 2 illustrates a preferred exemplary embodiment for a comparator circuit, a counter circuit and a decoder circuit.

Referring to FIG. 2, the comparator circuit COMP comprises a second AND gate UG2 to whose inputs the bit-serially offered correlated image signal VIDK and the blanking signal CYC are supplied. This logical linkage means that the edge columns of a transmitted image pattern, here an already correlated image pattern, are not taken into consideration in the comparison with the current image signal VID which is likewise supplied to the comparator circuit COMP. Three positions of the correlated image pattern, respectively laterally displaced by a column integral, must now be generated for the correlated image signal VIDK trimmed at its edges in that manner. Two delay flip-flops VF1' and VF2', which are connected in succession at the output of the second AND gate UG2 again serve for that purpose. The correlated image signal VIDK directly emitted at the output of the second AND gate UG2 belongs to the left-hand image pattern, the image signal, delayed once, occurring at the output of the first delay flip-flop VF1' belongs to the center image pattern, and the image signal residing at the output of the second delay flip-flop VF2' belongs to the right-hand image pattern.

If the current image signal VID, given a relative velocity of 0 between the scanning unit ABE and the recording medium, is now to be positioned, synchronous to the correlated image signal VIDK of the center position, then it, also, must be delayed. It is therefore supplied to a further delay flip-flop VF3'. All of the three delay flip-flops are controlled, with respect to state, by means of the slow clock pulse T2.

The particularity of the comparison desired resides in the fact that the correlated image signal VIDK is not, indeed, compared with the current image signal VID in all three positions, but rather a comparison of the correlated image pattern of the center position with the left-hand position, or, respectively, with the right-hand position, as well as of the center position of the correlated image pattern with the current image pattern is undertaken. Three EXCLUSIVE OR gates EX1, EX2 and EX3 serve for this purpose. One respective input of these EXCLUSIVE OR gates is connected with the output of the first delay flip-flop VF1'. The second input of the first EXCLUSIVE OR gate EX1 is connected to the delay flip-flop VF3' delaying the current image signal VID. The second EXCLUSIVE OR gate EX2 is connected by its second input directly with the output of the AND gate UG2 and the third EXCLUSIVE OR gate EX3 is connected with the output of the second delay flip-flop VF2'. Since an EXCLUSIVE OR gate, as is known in the art, only conducts an output signal "1" when different signal states are offered to both of its inputs, the three outputs of the comparator COMP always emit a comparison signal "1" when the image elements of the two image patterns respectively compared with one another are different. It can well be imagined and will be explained on the basis of another exemplary embodiment that this is precisely what characterizes the contours of the image patterns when the same are position-displaced with respect to one another. It should be added here this is always true for the three variously offered correlated image signals VIDK upon unequivocal scanning, whereas, according to the above definition, this can only be the case when a relative velocity occurs between the scanning unit ABE and the recording medium to be scanned.

These three output signals of the comparator circuit COMP are offered to the counter circuit CT. The counter circuit CT has two forward-backward counters CTR1 and CTR2. The first of the two forward-backward counters is allocated with its counting input EN to the output of the second EXCLUSIVE OR gate. It therefore counts any difference between the correlated image patterns of the center and left positions. The corresponding case is true for the second forward-backward counter CTR2, which is allocated to the third EXCLUSIVE OR gate EX3, i.e. to the two correlated image pattern of the center and write positions. Both counters are reset, in common, before the beginning of an image transmission via the synchronizing signal SYNC supplied thereto at their reset inputs R. Further, the blanking signal CYC is supplied to the counters by way of a blocking input EN via a further synchronizing flip-flop SF4 which is driven by means of the second clock pulse T2, so that the edge columns remain unconsidered during the image transmission. The counting direction of both counters is laid down by means of the output signal of the first EXCLUSIVE OR gate EX1. By definition, let the counting direction always be positive when the output signal is in the signal state "0". The reverse counting direction is adjusted by means of the second signal state. This is indicated in FIG. 2 by means of the corresponding citation of the inputs for the counting direction.

The two eight-stage forward-backward counters CTR1 and CTR2 have a corresponding plurality of outputs, of which, however, only the four higher-value outputs are wired. This takes into consideration the fact that only beginning at a certain threshold are secured coincidences in the evaluated image patterns guaranteed and the consideration of the lower-value bit positions could falsify the comparison. This total of the eight-signal outputs of the counter circuit CT are connected to the decoder DEC. A read-only memory ROM, which has a storage capacity of 256×4 bits is addressed in the decoder DEC with the respective counter reading of the two counters of the counter circuit CT. This read-only memory ROM accordingly has four signal outputs which are connected to an output register REG. Controlled by means of the slow clock pulse T2, the addressed memory content is transferred to the output register REG at the end of an image transmission. The transfer is triggered by means of the synchronizing signal SYNC which is linked with the slow clock pulse T2 by way of a third AND gate UG3 and is supplied to the clock pulse input of the output register REG. The output register REG emits a four-place control signal, the selection signal AW, at the output of the decoder DEC, which is supplied to the switching device SW.

Figure 3:
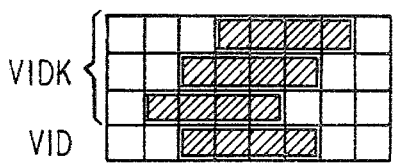
FIGS. 3-5 illustrate the evaluation of a sample image pattern varying directionally independent.
Figure 4:
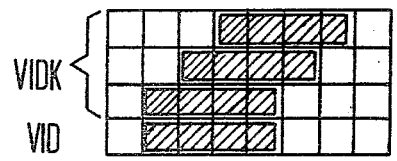
Figure 5:
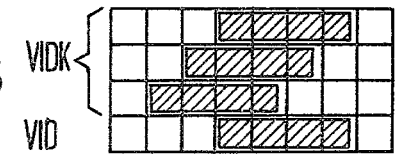

In the following, the function of the circuit arrangement illustrated in FIG. 2 is explained on the basis of FIGS. 3-6. In FIGS. 3, 4 and 5, the three normally-occurring combinations of various positions of the image patterns to be compared are illustrated for a simple example for better understanding. A simple image pattern having four bits is indicated in FIG. 3, being drawn in four lines below one another. The upper three lines represent the positions of an already corrected image pattern VIDK, respectively displaced by a scanning column. In the fourth line, a current image pattern VID is illustrated in the correct position with respect to the center-correlated image pattern. This position combination of the various image patterns corresponds to the definition and should occur in the ideal case when there is no relative velocity between the scanning unit ABE and the recording medium to be scanned upon the scanning of the actual image pattern.

In the three lines below these image patterns, the respective output signals of the three EXCLUSIVE OR gates EX1, EX2 and EX3 of the comparator circuit COMP are illustrated for the positions illustrated. The signal states can be easily derived from the image patterns illustrated above with their columns aligned.

According to the definition, in this case the two forward-backward counters CTR1 and CTR2 are adjusted to a positive counting direction by means of the output signal of the first EXCLUSIVE OR gate EX1. They therefore respectively evaluate both counter results in the second and sixth or, respectively, the third and seventh column positively.

FIG. 4 illustrates a current image pattern VID which is no longer arranged in the center, but which is displaced to the left with reference to the correlated image patterns VIDK which are again arranged displaced by a column with respect to one another. In the third column or, respectively, the sixth column the output signals of the first EXCLUSIVE OR gate EX1 are therefore changed. This displacement to the left can again be identically encountered at the output of the second EXCLUSIVE OR gate EX2. These counting events to be evaluated are negatively evaluated in the first forward-backward counter CTR1. On the other hand, the output signals of the third EXCLUSIVE OR gate EX3 are positively counted. For counter events always occur there when the first EXCLUSIVE OR gate EX1 exhibits the signal state "0" at its output, i.e. lays down a positive counting direction of the connected counter.

FIG. 5 illustrates the inverse case of a displacement to the right of the current image pattern VID with respect to the center position of the correlated image pattern VIDK. Comparably with the configuration according to FIG. 4, here the counting manner of the forward-backward counters CTR1 and CTR2 is reversed.

Figure 6:
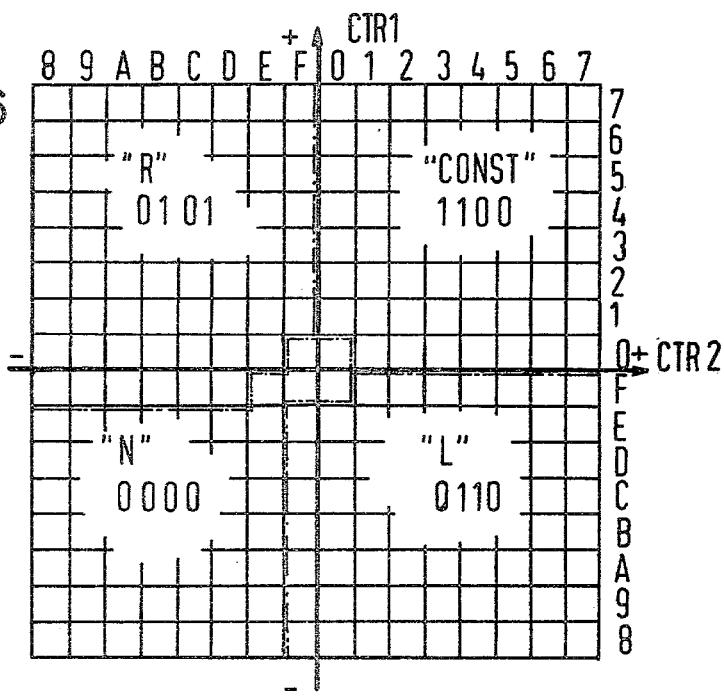
FIG. 6 illustrates, on the basis of a surface diagram, the varying evaluation of a different possible position combinations of successive, varying image patterns.

FIG. 6 pictorially illustrates how the counter readings of the two forward-backward counter CTR1 and CTR2, which have thus come about, are evaluated in the decorder DEC. The diagram illustrates a pictorial representation of the content of the read-only memory ROM of the decoder DEC. In the diagram of FIG. 6, the counter readings of the forward-backward counters CTR1 and CTR2 are drawn in as coordinate axes. A positive counter state of both countes addresses a segment in the read-only memory which lies at the upper right in FIG. 6 and is referenced "CONST". It was explained above, in conjunction with FIG. 3, that both counters can only count positively when the current image pattern VID coincides with the center position of the correlated image pattern VIDK. In this case, a binary digit is addressed in the read-only memory ROM, which digit is likewise indicated in the addressed quadrant of the diagram of FIG. 6. This four-place binary number is transmitted into the output register REG of the decoder DEC, as explained above, and represents the selection signal AW. In the case of this first signal combination, the selection signal AW adjusts the switching device SW in such a manner that the correlated image signal VIDK in the second image memory RAM2 is not changed.

The second segment at the upper left, referenced with "R", reproduces an area which corresponds to a displacement to the right. The selection signal AW addressed in this case adjusts the switching device in such a manner that the current image signal VID is disjunctively linked with the correlated image signal VIDK, displaced to the right, and is written into the second image memory RAM2. The corresponding case is true displacement to the left "L" in the quadrant line diagonally opposite at the lower right.

The fourth quadrant, finally, is referenced with "N". As illustrated, this area is to include the zero point of the coordinate system. In particular, both counters CTR1 and CTR2 exhibit a counter reading "0" when not black image elements exist in the current image signal VID. Beyond this, as follows from the above description of FIGS. 4 and 5, the counter readings become "0" or exhibit a negative number when there is no coincidence between the current signal and a correlated signal. This is always the case when an image signal VID for a new image pattern is transmitted for the first time. The four-place binary number "0000" indicated for this area adjusts the switching device SW in such a manner that the current image signal VID is written without change from the first image memory RAM1 into the second image memory RAM2.

Although I have described my invention by reference to a particular illustrative embodiment thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. In a circuit arrangement for editing a scanned pattern for machine character recognition in which a scanner moves relative a recording medium and produces a plurality of image patterns which are position-displaced with respect to one another and which are converted into digital image signals representing black and white elements, and in which the image elements are stored in a first image memory, the improvement comprising:

a second image memory for storing an image pattern corresponding to an image pattern produced by the scanner;

an image element counter connected to the scanner for counting the black elements being fed to the first image memory and operable to produce an output signal characterizing a "fat" scanning pattern is response to a count above a predetermined value;

a switching device connected between the first image memory and said second image memory and connected to said image element counter, said switching device operable in response to the contents of the two memories, which correspond to one another in memory position, to disjunctively link the same synchronously position-by-position, whereby, depending on the output signal state of said image element counter, the black image elements are employed for overwriting in the case of weak characters and the white image elements are employed for overwriting in the case of fat characters.

2. The improved circuit arrangement of claim 1, wherein the image signals of a scanning pattern provided line-by-line in bit-serial form, and further comprising:

an address counter operating in synchronism with the delivery of an occurring image signal connected to address the first image memory;

an address adder connected between said address counter and said second image memory operable to add a constant to the address count and address said second image memory with the added count in order to eliminate the position displacement of image patterns in the line direction.

3. The improved circuit arrangement of claim 2, and further comprising:

first and second flip-flops connected between said second image memory and said switching device for feeding the correlated image signals to said switching device in synchronism with the occurring image signals in three positions displaced from one another by a respective column interval, whereby the constant added to the address count is selected such that the correlated image signal in the center position occurs position-synchronous with the occurring image signal upon standstill of the scanner with respect to the recording medium.

4. The improved circuit arrangement of claim 3, and further comprising:

a comparator assigned to said switching device and connected to the scanner to receive the occurring image signals and connected to said second image memory for receiving correlated image signals in three positions in order to determine the degree of coincidence;

an additional counter connected to said comparator for counting the comparison results in response to center/left or center/right comparison results; and a decoder connected between said counter and said switching device and operable to determine the best coincidence and the scanning direction from said counter and provide control signals to said switching device to control the disjunctive linkage of the position of the correlated image signal which best coincides with the occurring signal.

5. The improved circuit arrangement of claim 4, wherein said comparator comprises:

first and second serially-connected delay flip-flops, connected to receive clock pulses and the correlated image signals and operable to delay the correlated image signals by respective clock pulses; a third delay flip-flop connected to receive clock pulses and the occurring image signals and operable to delay the occurring image signals by one clock pulse; and a plurality of EXCLUSIVE OR gates each connected to said first flip-flop, a first of said gates connected to receive the undelayed correlated image signals, a second of said gates connected to said second flip-flop, to receive twice-delayed correlated image signals and a third of said gates connected to said third flip-flop to receive delayed-occurring image signals, said gates operable to provide the comparison results.

6. The improved circuit arrangement of claim 5, wherein said additional counter is further defined as comprising:

first and second forward-backward counters, each of said counters including a counter direction input connected to said third EXCLUSIVE OR gate so that the gate output signal emitted upon coincidence of image and correlated image signals, in the center position, prescribes a forward counting direction, and each of said counters including a counting input connected to respective ones of said first and second EXCLUSIVE OR gates.

7. The improved circuit arrangement of claim 6, wherein said decoder is further defined as comprising:

an output register connected to said switching device and operable to emit said control signals to said switching device; and a read-only memory connected between said forward-backward counters and said output register, said read-only memory addressed by said counters to provide the control signals for said switching device.

* * * * *